United States Patent [19]

Matsui et al.

[11] Patent Number: 4,542,846

[45] Date of Patent: Sep. 24, 1985

[54] METHOD OF PRODUCING A MULTIPLE-WALL PIPE STRUCTURE WITH ANTICORROSION END PROTECTION

[75] Inventors: Shigetomo Matsui, Higashiosaka; Toshio Atsuta, Akashi; Shouji Toma, Kakogawa, all of Japan

[73] Assignee: Kawasaki Jukogyo Kabushiki Kaisha, Hyogo, Japan

[21] Appl. No.: 567,315

[22] Filed: Dec. 30, 1983

Related U.S. Application Data

[62] Division of Ser. No. 358,793, Mar. 16, 1982, abandoned.

[51] Int. Cl.⁴ ............................................. B23P 11/02
[52] U.S. Cl. .................................................. 228/112
[58] Field of Search ............... 228/112, 113, 114, 159, 228/160, 162, 131, 175, 225, 226, 263.15, 189

[56] References Cited

U.S. PATENT DOCUMENTS

| | | | |
|---|---|---|---|
| 2,308,307 | 1/1943 | Robinson | 228/189 |
| 2,516,689 | 7/1950 | France | 138/143 |
| 2,718,690 | 9/1955 | Ulam | 228/175 |
| 2,763,923 | 9/1956 | Webb | 228/160 |
| 3,020,068 | 2/1962 | Costanzo | 285/55 |
| 3,107,421 | 10/1963 | Turnbull | 228/189 |
| 3,460,235 | 8/1969 | Roberts | 228/114 |
| 3,529,337 | 9/1970 | Pfaff | 228/175 |

FOREIGN PATENT DOCUMENTS

| | | | |
|---|---|---|---|
| 112762 | 9/1979 | Japan | 228/112 |
| 797859 | 1/1981 | U.S.S.R. | 228/112 |

Primary Examiner—Nicholas P. Godici
Assistant Examiner—M. Jordan
Attorney, Agent, or Firm—Wenderoth, Lind & Ponack

[57] ABSTRACT

A multiple-wall pipe structure having at least two pipes tightly fitted one within another, one of which is of a corrosion-resistant material whereas the other is of a noncorrosion-resistant material. In order to protect against corrosion the end faces of the noncorrosion-resistant pipe and the seams between the two pipes, either during storage in the form of discrete pipe sections or in use by being welded or otherwise jointed end to end, a pair of anticorrosion rings of a corrosion-resistant material are integrally attached to the opposite ends of the fitted pipes so as to cover at least the end faces of the noncorrosion-resistant pipe and to seal the seams therebetween.

3 Claims, 13 Drawing Figures

METHOD OF PRODUCING A MULTIPLE-WALL PIPE STRUCTURE WITH ANTICORROSION END PROTECTION

This is a division of application Ser. No. 358,793 filed Mar. 16, 1982, now abandoned.

BACKGROUND OF THE INVENTION

This invention relates generally to pipes for fluid transportation and particularly to a method of producing a multiple-wall pipe structure made up of two or more pipes of different diameters tightly fitted one within another, at least one of which is of a corrosion-resistant material. More particularly, the invention deals with lengths or sections of such dual- or multiple-wall pipe structure having their ends protected against the corrosive or oxidative action of ambient air or moisture during storage or shipment and of the fluid being transported in use.

Let us consider, as a typical example of the multiple-wall pipe structure under consideration, a dual-wall pipe intended for oil or petroleum recovery from its wells, for the conveyance of the recovered oil, or for use in nuclear power plants. The pipe for such applications must be pressure-, heat- and corrosion-resistant. Hence the dual-wall pipe structure takes the form of what is known as stainless-clad-steel, having an outer pipe, or pipe proper, of carbon steel and an inner pipe, or lining, of a stainless alloy commonly referred to as stainless steel. The carbon steel pipe and the stainless steel lining are manufactured separately and then nested together in tight fitting relationship by various methods familiar to the metal pipe specialists.

A corrosion problem arises with such stainless-steel-lined steel pipe because it is manufactured in unit lengths, or sections, to be joined in site as by welding or with use of couplings. During storage of the manufactured pipe lengths, particularly in open air, or during their shipment, corrosion or oxidation is liable to take place particularly at their unprotected ends. Even after installation, also, the corrosive fluid being conducted through the piping can easily attack the welded or coupled joints between the pipe lengths.

It has been suggested to protect the ends of multiple-wall pipe lengths against corrosion by, for example, "seal welding" or by the padding of weld metal. The "seal welding" technique is unsatisfactory, however, in the strength in the axial direction of the jointed pipe. The padding of weld metal, on the other hand, necessitates the application of considerable heat to the end portions of the pipe lengths, thus possibly straining or deforming them. Both of these welding techniques further make it difficult to machine the end portions of the pipe lengths into a state suitable for jointing them and particularly to cut external taper threads on the pipe end portions for connection by means of internally taper-threaded couplings.

SUMMARY OF THE INVENTION

The present invention overcomes the corrosion problem heretofore encountered with individual lengths of multiple-wall pipe and makes it possible to protect the ends of such pipe lengths against corrosion during storage and shipment as well as in use. The end-protected lengths of multiple-wall pipe produced in accordance with the invention are also notable for the ease and firmness with which they can be jointed together into a continuous pipeline.

In accordance with the invention, summarized in brief, there is provided a method of producing multiple-wall pipe structure which has at least two pipes tightly fitted one within another, one of which is of a corrosion-resistant material and the other of which is of a noncorrosion-resistant material. The invention features an anticorrosion ring of a corrosion-resistant material integrally secured to each end of the pipe structure so as to cover at least the end face of the noncorrosion-resistant pipe and to close the seam between the fitted or nested pipes.

A typical multiple-wall pipe structure suitable for end protection by the teachings of the invention is carbon steel pipe with a lining of stainless steel. However, the invention finds application to pipe of a noncorrosion-resistant material with a sheath or external cladding of a corrosion-resistant material. As indicated in the foregoing summary, therefore, either the inner or outer pipe of the fitted pipes may be corrosion-resistant.

In some preferred embodiments of the invention the inner and outer pipes are of the same axial dimension, and the anticorrosion rings are of the same inside and outside diameters as the composite pipe structure. Friction-welded or otherwise integrally secured to the opposite ends of the nested pipes, the anticorrosion rings completely cover their end faces and seal the seams therebetween. The inner and outer pipes need not be of the same axial dimension, however. In another embodiment of the invention the inner pipe, which is corrosion-resistant, is longer than the noncorrosion-resistant outer pipe, having opposite end portions projecting beyond the ends of the outer pipe. The end protection of this dual-wall pipe structure is possible by forming anticorrosion rings around the projecting end portions of the inner pipe so as to cover the end faces of the outer pipe and to close the seams between the nested pipes. The exposure of the end faces of the corrosion-resistant inner pipe presents no corrosion problem.

End-protected as described above, the individual lengths of multiple-wall pipe structure are not subject to corrosion at their ends even if put in open-air storage for any extended length of time or shipped to their places of installation by sea. The invention also teaches to machine the anticorrosion rings to an extent necessary to make easy the subsequent jointing of the pipe lengths. Thus, at the places of installation, the end-protected lengths of multiple-wall pipe structure can be readily welded or coupled together to provide leakproof joints, which can effectively resist the corrosive action of the fluid being carried.

The above and other features and advantages of this invention and the manner of attaining them will become more apparent, and the invention itself will best be understood, from a study of the following description of some preferred embodiments of the invention, taken together with the attached drawings.

DESCRIPTION OF THE PREFERRED EMBODIMENTS

Figure 1:
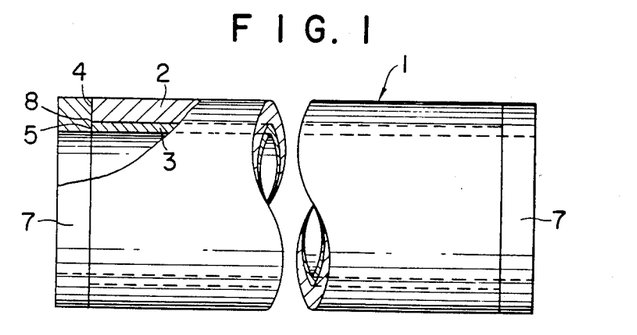
FIG. 1 is a partial side view, partly broken away and shown in axial section for illustrative convenience, of an end-protected length of a dual-wall pipe structure constructed in accordance with the principles of the present invention.

While the end-protected multiple-wall pipe structure produced in accordance with the present invention may assume a variety of configurations in practice, both as to the organization of the pipe structure itself and to its end protections, FIG. 1 of the drawings shows the most fundamental of such possible configurations. The reference numeral 1 in this figure generally designates a unit length or section of a dual-wall pipe structure to which the invention finds application. The dual-wall pipe structure 1 comprises an outer pipe or pipe proper 2 of a noncorrosion-resistant material and an inner pipe or lining 3 of a corrosion-resistant material, the latter being nested within the former in tight fitting relationship. Both pipes 2 and 3 are of the same axial dimension in this particular embodiment, having annular end faces 4 and 5 disposed flush with each other.

If the pipe structure 1 is to be used for the conveyance of petroleum, for instance, by being jointed with other similarly end-protected pieces of dual-wall pipe into a pipeline, then the outer pipe 2 is of carbon steel, or that of high tensile strength as the intended application demands, whereas the inner pipe 3 is of stainless steel. Several methods have been suggested and practiced for the manufacture of such dual- or multiple-wall metal pipe; the invention allows the use of any of such known methods without being prejudiced thereby.

Identified by the reference numeral 7 are a pair of anticorrosion rings integrally fixed to the opposite ends of the nested pipes 2 and 3. Each anticorrosion ring 7 in this embodiment of the invention has the same outside diameter as the outer pipe 2 and the same inside diameter as the inner pipe 3, thus completely covering the end faces 4 and 5 of the pipes and sealing the annular seam 8 therebetween. For the best results the anticorrosion rings are of the same material (stainless steel in this case) as the corrosion-resistant inner pipe 3 and are welded to the two fitted pipes. The welding of the anticorrosion rings is possible by several methods that will be illustrated and later described in more detail, and such welding results in interfaces between ring 7 and surfaces 4 and 5 that are metallurgically bonded.

Discrete end-protected pieces of dual-wall pipe structure constructed and manufactured as in the foregoing may be put in storage pending shipment or may immediately be shipped to their places of installation. During such storage, as in open air, or transportation, as by sea, the anticorrosion rings 7 protect the end faces 4 of the noncorrosion-resistant outer pipe 2 from corrosion or oxidation and prevent the intrusion of atmospheric air or moisture into the seams 8 between the two nested pipes 2 and 3. The end-protected pipe lengths can therefore be positively jointed together through their anticorrosion rings 7, as by welding or with the use of couplings, to provide leakproof joints, practically precluding the danger of implosion or cracking in use. The methods of connecting the end-protected pipe lengths will also be illustrated and later discussed to an extent necessary to manifest the utility of the instant invention.

Figure 2:
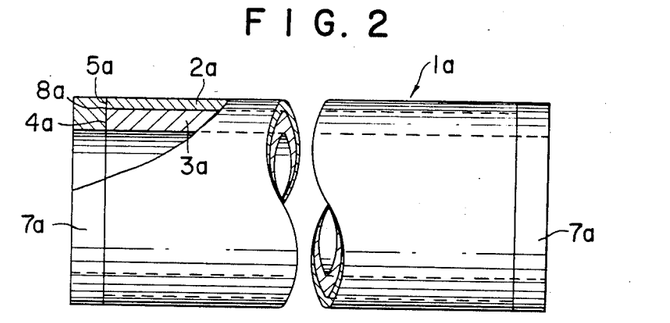
FIG. 2 is a view similar to FIG. 1 but showing another example of an end-protected length of a dual-wall pipe structure produced in accordance with the invention.

FIG. 2 illustrates another possible form of the end-protected multiple-wall pipe structure 1a produced in accordance with the invention, having anticorrosion rings 7a integrally fixed to its opposite ends. Intended for undersea installation, for example, the pipe structure 1a has an inner pipe or pipe proper 3a of a noncorrosion-resistant material and an outer pipe or sheath or cladding 2a of a material capable of protecting the inner pipe from the corrosive action of seawater. The anticorrosion rings 7a of the corrosion-resistant material cover the opposite end faces 4a and 5a of the nested pipes and seal the seams 8a therebetween. The other details of construction and manufacture are substantially as set forth above in connection with FIG. 1.

The two preceding embodiments of the invention deal with noncorrosion-resistant pipe provided with a corrosion-resistant lining or sheathing. It will be seen, then, that the invention is equally well applicable to pipe clad with both an anticorrosion lining and an anticorrosion sheathing, as for use with offshore oil wells. Such triple-wall pipe may be end protected against corrosion in essentially the same way as in FIG. 1 or 2.

Figure 3:
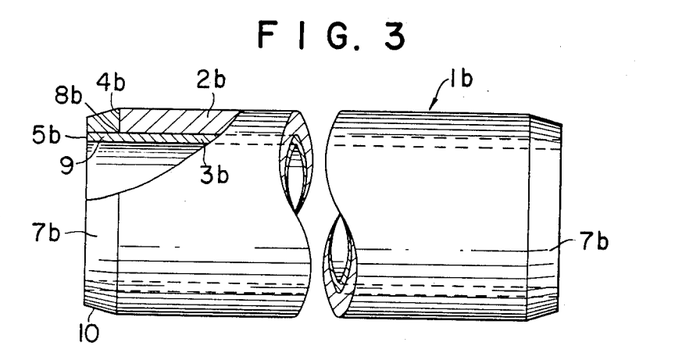
FIG. 3 is also a view similar to FIG. 1 but showing still another example of an end-protected length of a dual-wall pipe structure produced in accordance with the invention.

In FIG. 3 is shown still another preferred form of the end-protected multiple-wall pipe structure produced in accordance with the invention. Generally labeled 1b, the pipe structure differs from the preceding embodiments of the invention in that an inner pipe or lining 3b is of greater axial dimension than an outer pipe or pipe proper 2b, having opposite end portions 9 projecting out of the outer pipe. The outer pipe 2b may be of carbon steel, and the inner pipe 3b of stainless steel, as in the pipe structure 1 of FIG. 1. The close-fitting dual-wall metal pipe structure of this configuration can be assembled as by the known thermal expansion method, hydraulic expansion method or a combination thereof.

A pair of anticorrosion rings 7b closely encircle the projecting end portions 9 of the inner pipe 3b, covering the end faces 4b of the outer pipe 2b and sealing the seams 8b between the two pipes. Although the anticorrosion rings 7b leave the end faces 5b of the inner pipe 3b uncovered, this presents no corrosion problem, even if the pipe structure 1b is put to open-air storage for any prolonged period of time, because the inner pipe is itself of an anticorrosion material.

The anticorrosion rings 7b of FIG. 3 also differ from the rings 7 and 7a of FIGS. 1 and 2 in that the former taper as they extend away from the end faces 4b of the outer pipe, as identified by the reference numeral 10. This taper of the anticorrosion rings makes materially easier the subsequent machining of external taper threads on the opposite ends of the end-protected pipe structure 1b, for connection with other similar pieces of pipe structure by use of internally taper-threaded couplings, as will be detailed later. Alternatively, instead of such tapering, the anticorrosion rings may be chamfered to provide a fillet for use in butt-welding successive end-protected pieces of such pipe structure. As a further alternative, instead of such tapering or chamfering, external taper threads may be formed on the anticorrosion rings and the neighboring parts of the outer pipe immediately after the formation of the anticorrosion rings.

Figure 4:
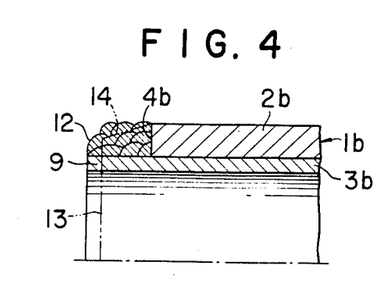
FIG. 4 is a fragmentary axial section explanatory of a method of forming the tapering anticorrosion rings seen in FIG. 3.

FIG. 4 is explanatory of a method of creating the tapering anticorrosion rings 7b of FIG. 3. It will be noted that each end portion 9 of the inner pipe 3b of the dual-wall pipe structure 1b as just assembled, projects out of the outer pipe 2b to a greater extent than in FIG. 3. The creation of the tapering anticorrosion rings starts with padding, with a corrosion-resistant weld metal (stainless steel in this case), of the angle between each projecting inner pipe end portion 9 and the corresponding end face 4b of the outer pipe 2b. Such welding creates interfaces between the ring formed by the padding and end face 4b and the outer surface of portion 9 which are metallurgically bonded. Then each annular pad 12, as well as each projecting inner pipe end portion 9, is machine ground at 13 to provide a flat end face. Each annular pad is further machine ground at 14 to provide a tapering surface 10. Thus are completed the tapering anticorrosion rings 7b of FIG. 3.

The method of FIG. 4 is particularly advantageous in the simultaneous machining of the end faces of the anticorrosion rings and the inner pipe. Should the anticorrosion rings be formed separately and then fitted over the projecting end portions of the inner pipe, additional machining or sizing would become necessary to make their end faces exactly coplanar. However, the separate preparation of anticorrosion rings is not without its own advantage, provided that the projecting end portions of the inner pipe are pressfitted into the separately prepared rings, with the subsequent welding of the mating faces. The consequent application of residual compressive stresses to the inner pipe will minimize the possibility of stress-corrosion cracking.

It will be understood that the pads 12 of weld metal serve the purpose of protecting the ends of the dual-wall pipe structure against corrosion without any post-machining. The pipe structure may therefore be kept in storage in the state of FIG. 4, although the immediate machining of the pads into the tapering shape of FIG. 3 is recommended.

Figure 5:
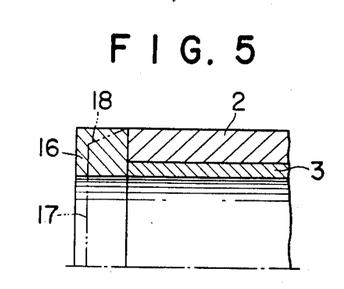
FIG. 5 is a view similar to FIG. 4 and explanatory of another possible method of producing tapering anti-corrosion rings, for use with a multiple-wall pipe structure of the type shown in FIG. 1.

The anticorrosion rings 7 and 7a of FIGS. 1 and 2, each shown attached to the two nested pipes 2 and 3, or 2a and 3a, of the same axial dimension, can of course be modified into tapering shape. Thus, in FIG. 5, a separately prepared ring 16 of greater axial length than is required as an anticorrosion ring of this invention is shown attached to the flat end faces of the fitted pipes 2 and 3 as by electron beam welding or friction welding. Then the ring 16 is ground at 17 and 18 to provide a tapering anticorrosion ring. The grinding of the end face of the ring at 17 is preferred for nonleaking contact with the similarly treated end face of an anticorrosion ring on another pipe length.

Figure 6:
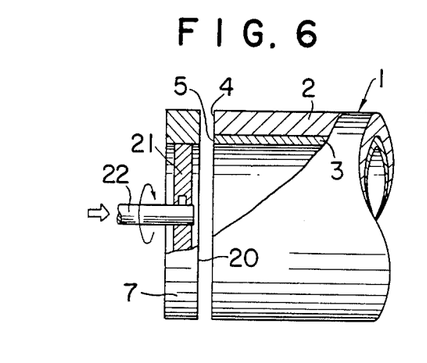
FIG. 6 is a partial side view, partly broken away and shown in axial section for illustrative convenience, explanatory of a method of securing each anticorrosion ring to one end of a length of a multiple-wall pipe structure, as represented by the embodiment of FIG. 1.

FIG. 6 illustrates one possible method of securing each stainless steel anticorrosion ring 7, for example, to the high-tensile carbon steel outer pipe 2 and stainless steel inner pipe 3 fitted therein as in FIG. 1. The illustrated method is friction welding, wherein two members are welded by rubbing the mating faces together under high pressure. Preparatory to the start of friction welding, the end faces 4 and 5 of the nested pipes 2 and 3, and the face 20 of each anticorrosion ring 7, are machine ground into precisely right angular relationship with their axes. Then the anticorrosion ring 7 is mounted via suitable locking means 21 on a shaft 22 of a friction welding machine, not shown, capable of both revolving the ring about its own axis and pressing the same against the nested pipes 2 and 3. Upon rubbing of their mating surfaces together and on their final pressing against each other, the anticorrosion ring 7 becomes frictionally welded to the nested pipes to form an integrated body, and such welding creates interfaces between ring 7 and end faces 4 and 5 which are metallurgically bonded.

Compared with usual butt welding, for example, the friction welding of the anticorrosion rings to the nested pipes offers the advantages of lower power cost, more positive joining, greater ease of operation, less heating and consequently less distortion of the welded members, and shorter period of time required. The leakproof, strong joints between the nested pipes and the anticorrosion rings also make it easier to weld or couple together such end-protected lengths of multiple-wall pipe structure without giving rise to such defects as deformation, cracks and pinholes.

The friction welding method, as heretofore practiced, suffers one disadvantage, however, when used for joining the anticorrosion rings to dual- or multiple-wall pipe of two or more different materials. Since the mating surfaces of each anticorrosion ring and the nested pipes are perpendicular to their axes as in FIG. 6, metal flow will take place both radially inwardly and outwardly of the members during their relative coaxial rotation. The inward metal flow may crimp the edge of the stainless steel inner pipe inwardly and, in the worst case, may cause its partial separation from the outer pipe. In the use of the pipe formed by joining pieces of such multiple-wall pipe, the separation of the inner pipe from the outer one will proceed further as the corrosive fluid being transported attacks the noncorrosion-resistant outer pipe, thus inviting implosion and cracking.

Figure 7:
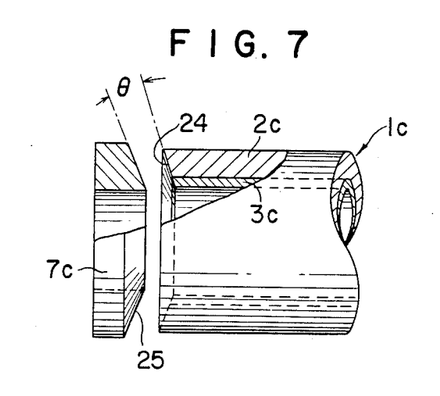
FIG. 7 is a view similar to FIG. 6 and is explanatory of a slightly modified method of securing each anti-corrosion ring to one end of a length of a multiple-wall pipe structure.
Figure 8:
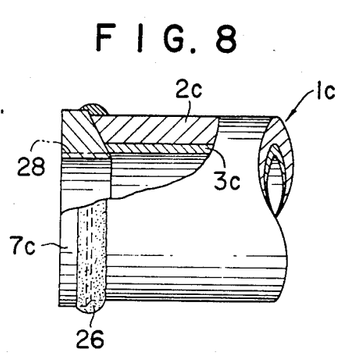
FIG. 8 is also a view similar to FIG. 6 but showing the anticorrosion ring as secured to the multiple-wall pipe structure by the method of FIG. 7.

FIGS. 7 and 8 teach how to remedy the above stated problem of friction welding. As better seen in FIG. 7, the opposite ends (one shown) of two nested pipes 2c and 3c of a dual-wall pipe structure 1c are chamfered or countersunk internally at 24 to provide a concave conoidal surface. One end of each anticorrosion ring 7c, on the other hand, is chamfered externally at 25 to provide a convex conoidal surface in complementary relation to the internal chamfer 24. Before friction welding, a slight angle $\theta$ may exist between the internal chamfer 24 of the dual-wall pipe structure 1c and the external chamfer 25 of the anticorrosion ring 7c when these members are placed in axial alignment. This angle can be zero, however, if the anticorrosion ring 7c has an inside diameter less than that of the pipe structure and an outside diameter greater than that of the pipe structure, as shown.

During friction welding, as the mating surfaces of the anticorrosion ring and the pipe structure become gradually fused or welded to each other by being set into relative coaxial rotation and pressed against each other, metal flow will take place only in a radially outward direction because of the existence of the outwardly diverging angle $\theta$ between the mating surfaces. Such outward metal flow will occur even if the angle $\theta$ is initially zero. This is because the anticorrosion ring 7c with its greater wall thickness is more rigid than the composite pipe structure. Accordingly, on being pressed against the external chamfer 25 of the anticorrosion ring, the internal chamfer 24 of the pipe structure will be slightly turned outwardly to create the desired angle $\theta$. The smaller inside diameter of the anticorrosion ring helps also to restrain the inner pipe 3c of the composite pipe structure from crimping inwardly during friction welding.

FIG. 8 is an illustration of the completed welding, showing at 26 an annular fin of excess metal produced by the outward metal flow. The anticorrosion ring 7c is to be at least internally ground to provide an inner surface, indicated at 28, flush with that of the dual-wall pipe structure 1c.

It will be seen that the internal and external chamfers 24 and 25 may not necessarily be straight, but may be curved, as viewed in axial section as in FIGS. 7 and 8. The chamfering of the internal and external edges of the parts to be friction welded affords the additional advantage of making the areas of their mating surfaces greater, resulting in higher weld strength. Further, the parts will undergo no appreciable misalignment while being friction welded with their internal and external chamfers in interengagement. It will also be understood that the chamfering of the edges does not add to the number of steps of the friction welding process, because the method of FIG. 6 also requires the machine grinding of the mating surfaces preparatory to welding.

Figure 9:
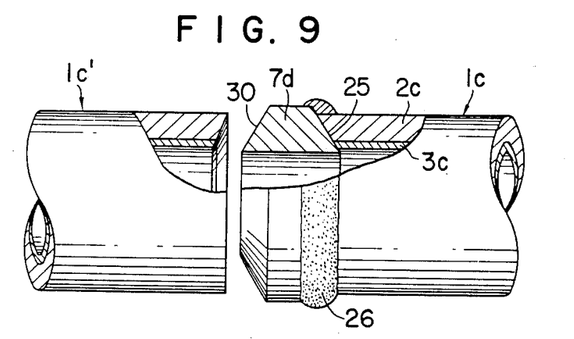
FIG. 9 is a partial side view, partly broken away and shown in axial section for illustrative convenience, of a modified anticorrosion ring in accordance with the invention, shown secured to one length of a multiple-wall pipe structure and ready for securing to another length.

FIG. 9 represents another example of an anticorrosion ring 7d, which functions not simply as a corrosion protection for the ends of multiple-wall pipe lengths but also as a corrosionproof coupling therebetween. In order to perform the dual function, the anticorrosion ring 7d is chamfered externally at its opposite ends 25 and 30 in accordance with the teachings of FIGS. 7 and 8. In FIG. 9 the anticorrosion ring is shown friction welded to one length of dual-wall pipe structure 1c and ready for connection to another length of such pipe structure 1c'. The opposite ends of these pipe lengths 1c and 1c' are chamfered internally to mate with the external chamfers of the anticorrosion ring. The other details of construction, method of connection, and advantages accruing therefrom will be evident from the foregoing discussion of FIGS. 7 and 8.

Figure 10:
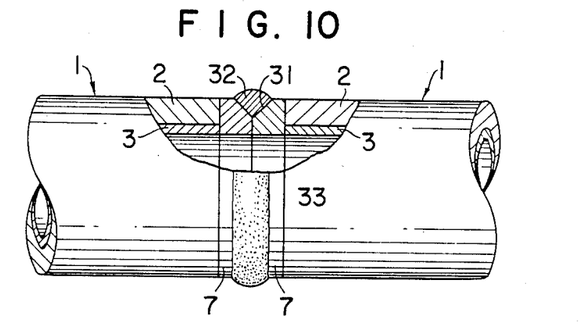
FIG. 10 is a view similar to FIG. 9 but showing two end-protected lengths of a dual-wall pipe structure, each constructed as in FIG. 1, jointed to each other by welding.

FIG. 10 illustrates a method of butt-welding end-protected lengths of dual-wall pipe structure 1 of FIG. 1, in order to provide, typically, an oil pipeline. The anticorrosion rings 7 are externally beveled to provide a fillet 31 when two pipe lengths are placed in end-to-end abutment. The contact surfaces of the anticorrosion rings are assumed to have been ground smooth. A fused filler metal is introduced into the fillet 31 as identified by the reference numeral 32, in accordance with the usual welding practice, thus forming a welded joint 33. By the repetition of this welding operation a required number of such end-protected pipe pieces are jointed into a continuous oil line.

Thus, in the completed pipeline, the welded pairs of anticorrosion rings 7 and the corrosion-resistant inner pipe or lining 3 coact to positively guard the noncorrosion-resistant outer pipe or pipe proper 2 against the corrosive action of the fluid flowing therethrough. The outer pipe, on the other hand, functions to provide strength for withstanding the pressure of the fluid.

Figure 11:
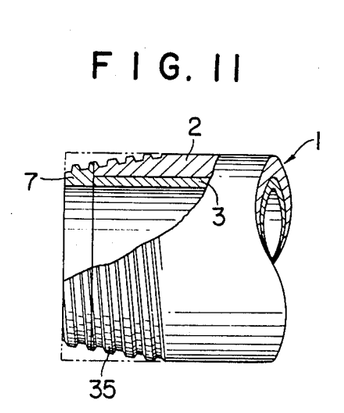
FIG. 11 is a partial side view, partly broken away and shown in axial section for illustrative convenience, of the end-protected length of the dual-wall pipe structure of FIG. 1 after having been machined to have an external taper thread.

The use of taper-threaded couplings is more common for connecting lengths of pipe intended for use in oil wells, because of the need for the repeated connection and disconnection of the pipe lengths. As depicted in FIG. 11, therefore, the opposite end portions of each end-protected length of dual-wall pipe structure 1 are machined to bear external taper threads 35.

Figure 12:
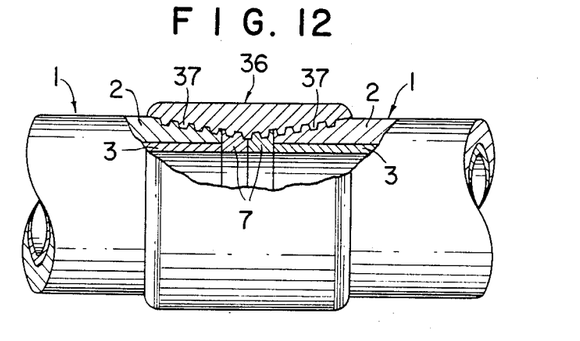
FIG. 12 is a view similar to FIG. 10 but showing two end-protected lengths of dual-wall pipe structure, each machined as in FIG. 11, jointed with an internally taper-threaded coupling.

FIG. 12 shows one internally taper-threaded coupling 36 jointing two end-protected, externally taper-threaded lengths of dual-wall pipe structure 1. The coupling 36 has a pair of internal threads 37 tapering inwardly from its opposite ends, and the two pipe lengths are inserted into this coupling 36 from its opposite ends into end-to-end engagement with each other. In thus coupling the pipe lengths the abutting faces of the anticorrosion rings 7 should be machined to mirror-like finish for nonleaking contact with each other. Then the coupling 36 need not be of a corrosion-resistant material but is required only to provide strength for joining the pipe lengths, so that the latter factor may constitute a sole consideration in the determination of the wall thickness of the coupling. It will be appreciated that in the piping formed by coupling successive pipe lengths as in FIG. 12, also, the anticorrosion rings 7 coact with the inner pipe 3 to positively protect the outer pipe 2 from the corrosive action of the fluid being conveyed.

As has been mentioned, the anticorrosion rings in accordance with the invention can be fixed to each length of multiple-wall pipe structure by electron beam welding, or by welding with other forms of radiant beam energy. Illustrated in FIG. 13 by way of reference is an example of radiant beam welding equipment suitable for use in the practice of this invention. The welding equipment, generally designated 50, is shown together with the dual-wall pipe structure 1 of FIG. 1 by way of example, having the carbon steel outer pipe 2 and the stainless-steel inner pipe 3. The stainless-steel anticorrosion ring 7 to be beam welded to one end of the pipe structure 1 is already tentatively welded in position thereto in any suitable manner. The pipe structure 1 together with the anticorrosion ring 7 is immovably supported in a preassigned position and at a preassigned height above a floor 52 by suitable means, not shown.

Figure 13:
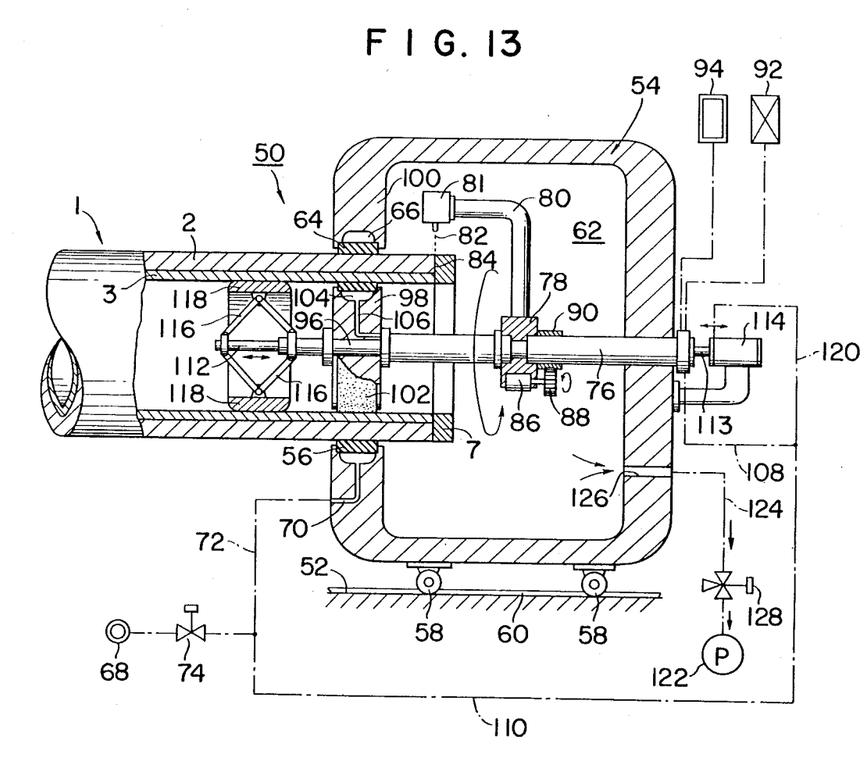
FIG. 13 is a vertical section, partly in elevation, of an example of equipment for use in beam welding anticorrosion rings to lengths of a multiple-wall pipe structure in accordance with the teachings of the invention.

The beam welding equipment 50 includes a vacuum enclosure 54 having a circular opening 56 and mounted on wheels 58. These wheels make rolling engagement with a pair of rails 60 (one seen) laid on the floor 52. The vacuum enclosure 54 is therefore free to travel toward and away from the pipe structure 1 in its longitudinal direction. When moved toward the pipe structure 1 and held in its working position, as shown, the vacuum enclosure 54 receives a certain length of the pipe structure, as well as the anticorrosion ring 7 tentatively welded thereto, in its interior 62 through the opening 56.

Along the edge of the vacuum enclosure 54 bounding the opening 56, there is mounted an elastic seal ring 64 in the form of an endless strip of rubber or the like for airtightly sealing the junction between the vacuum enclosure and the pipe structure partly received therein. Formed behind the seal ring 64 is an annular plenum 66 in communication with a source 68 of air under pressure by way of a passage 70 in the vacuum enclosure 54 and a flexible conduit 72 having a solenoid-actuated valve 74. When this valve is opened, therefore, the pressurized air from the source 68 flows into the plenum 66 thereby causing the seal ring 64 to bulge out into airtight contact with the pipe structure 1.

Arranged centrally within the vacuum enclosure 54 is a hollow, stepped, nonrotatable shaft or bar 76 having a front end portion projecting into the pipe structure 1 and a rear end portion airtightly extending through the rear wall of the vacuum enclosure. A boss 78 is rotatably mounted on the shaft 76. An L-shaped holder arm 80 is rigidly coupled at one end to the rotary boss 78 and carries on the other end a welding gun 81 capable of emitting, for example, a beam of electrons indicated at 82. The electron beam 82 is directed toward the seam 84 between the pipe structure 1 and the anticorrosion ring 7 tentatively welded thereto. The rotary boss 78 has mounted thereon an electric motor 86 carrying a pinion 88 on its output shaft. The pinion meshes with a gear 90 nonrotatably mounted on the shaft 76. Thus, upon rotation of the pinion 88 in mesh with the fixed gear 90, the electron beam welding gun 81 revolves around the seam 84.

Although electrical details are not specifically illustrated, it is to be understood that the welding gun 81 is electrically connected through the shaft 76 to an electronic control system 92 external to the vacuum enclosure 54. The motor 86 is also electrically connected through the shaft 76 to an external electrical control system 94. Rotary contacts may be adopted for electrical connection between the shaft 76 and the rotary boss 78 thereon.

Fixedly mounted on a reduced diameter portion 96 of the shaft 76 is a disc 98, in register with the front wall 100 of the vacuum enclosure 54, having a diameter slightly less than the inside diameter of the pipe structure 1. An elastic seal ring 102 in the form of an endless strip of rubber or the like is attached to the circumference of the disc 98. Behind this seal ring, and in the circumference of the disc 98, there is formed an annular plenum 104 in communication with the pressurized air source 68 by way of a passage 106 in the disc 98, the interior of the shaft 76, flexible conduits 108 and 110, and the conduit 72 having the solenoid valve 74. Consequently, upon opening of this valve 74, not only the seal ring 64 but also the seal ring 102 bulges out into airtight contact with the pipe structure 1 for sealing the interior 62 of the vacuum enclosure 54 against the influx of air.

A rod 112 slidably extends through the shaft 76 and, projecting out of its rear end, is coupled at one end to the piston rod 113 of a single-acting air cylinder 114. The other end of the rod 112 projects out of the front end of the shaft 76 and is operatively connected to two or more toggles 116 acting between the shaft 76 and the rod 112. The toggles are further operatively coupled to respective friction shoes 118 of annular arrangement, concentric with the shaft 76, movable into and out of frictional engagement with the inside surface of the pipe structure 1. The air cylinder 114 communicates with the pressurized air source 68 by way of a flexible conduit 120 connected to the conduit 110. The contraction of this air cylinder results in the actuation of the toggles 116 urging the friction shoes 118 into forced contact with the pipe structure 1.

A vacuum pump 122 communicates with the interior 62 of the vacuum enclosure 54 via a conduit 124 coupled to a vacuum port 126 in the enclosure. The conduit 124 is provided with a solenoid-actuated valve 128.

In operation, while the vacuum enclosure 54 is held in a retracted position on the rails 60, the pipe structure 1 with the anticorrosion ring 7 to be beam welded thereto is mounted and retained in its preassigned position by the unshown means. Then, with the air cylinder 114 held extended and the solenoid valves 74 and 128 both held closed, the vacuum enclosure 54 is rolled over the rails 60 to receive the pipe structure 1 through its opening 56. During such reception of the pipe structure the friction shoes 118 with the toggles 116 are first inserted into the pipe structure, followed by the disc 98 which is guided by the friction shoes. The vacuum enclosure 54 is stopped upon reception of the pipe structure 1 to a predetermined depth, such that the welding gun 81 comes to a position of register with the seam 84 between the pipe structure and the anticorrosion ring 7.

Now the solenoid valve 74 is opened. The result is the delivery of pressurized air from the source 68 to the annular plenum 66 in the front wall 100 of the vacuum enclosure 54 and to the annular plenum 104 in the disc 98 on the shaft 76. The pressurized air in these plenum chambers acts on the elastic seal rings 64 and 102 thereby urging the same into airtight external and internal contact with the pipe structure 1. The opening of the solenoid valve 74 also results in the contraction of the air cylinder 114, whereupon the toggles 116 cause the friction shoes 118 to move into frictional engagement with the inside surface of the pipe structure 1. Thus is the shaft 76 positioned in coaxial relation with the pipe structure. The friction shoes 118 also function to lock the pipe structure against endwise displacement relative to the shaft, holding the seam 84 in position with respect to the welding gun 81.

Then, with the vacuum pump 122 set into operation, the other solenoid valve 128 is opened thereby evacuating the interior 62 of the vacuum enclosure 54. The solenoid valve 128 may be closed upon evacuation of the vacuum enclosure interior to a required degree of vacuum.

The electron beam welding of the seam 84 can now be started. The motor 86 on the rotary boss 78 is set into rotation by the electrical control system 94. As the pinion 88 on the motor output shaft rotates in mesh with the nonrotatable gear 90 on the shaft 76, the welding gun 81 on the holder arm 80 revolves therewith around the seam 84. The electronic control system 92 for the welding gun 81 causes the revolving run to emit the electron beam 82 toward the seam 84. The highly concentrated heat produced by the electron beam creates a deep weld between the pipe structure 1 and the anticorrosion ring 7. During such welding operation the elastic seal rings 64 and 102 are held firmly urged against the exterior and interior surfaces of the pipe structure 1 under air pressure to maintain a high degree of vacuum required for electron beam welding.

Upon completion of the welding, the welding gun 81 and the motor 86 are both stopped. Then the solenoid valve 74 is closed to allow the elastic seal rings 64 and 102 to contract out of forced contact with the pipe structure 1, and to permit the air cylinder 114 to move the friction shoes 118 out of frictional engagement with the pipe structure. Further, the solenoid valve 128 is opened to the atmosphere to admit air into the vacuum enclosure 54. Then the vacuum enclosure is retracted for relative withdrawal of the pipe structure 1 together with the anticorrosion ring 7 welded thereto. It will be easy for those skilled in automatic control engineering to automate the above sequence of operation.

In the illustrated welding equipment 50, the shaft 76 is made nonrotatable because then it is easier to cause the shaft to pass airtightly through the rear wall of the vacuum enclosure 54. This shaft may therefore be made rotatable and coupled to an external drive mechanism if no difficulty is encountered in airtightly sealing the junction between the rotatable shaft and the vacuum enclosure. In this case the gun holder arm may be fixedly mounted on the shaft for simultaneous revolution therewith. It will also be seen that the welding equipment 50 lends itself to ready adaptation for laser beam, instead of electron beam, welding. Notwithstanding the foregoing detailed disclosure, however, this welding equipment represents but one example of a variety of welders adoptable in the practice of the invention, including the friction welding machine mentioned in connection with FIGS. 6 to 9.

Although the present invention has been disclosed as adapted for dual-wall pipe intended principally for the transportation of oil, it is to be understood that the inventive concepts find application to triple- or other multiple-wall pipe and pipe fittings of various materials used for fluid transportation in general. Anticorrosion rings themselves may take a variety of forms other than those represented herein. An example of such additional forms is flanges, for the flange connection of lengths of pipes and of various pipe fittings.

What we claim is:

1. A method of producing a multiple-wall pipe structure comprising two pipes tightly fitted one within the other, the inner one of said pipes being of a corrosion-resistant metal and the outer one of said pipes being of a noncorrosion-resistant metal, and a pair of anticorrosion rings of a corrosion-resistant metal integrally attached to opposite ends of said pipes so as to cover at least the end faces of said pipe of the noncorrosion-resistant metal, said method comprising the steps of:

providing said two pipes in said tightly fitted manner;

providing said anticorrosion rings;

bringing each said anticorrosion ring into face-to-face pressing contact against the respective end faces of said pipes, while revolving each said ring about its center axis, thereby friction-welding said ring to said end faces of said pipes; and preventing inward crimping and separation of the end of said inner pipe away from said outer pipe during said friction-welding by internally chamfering said end faces of said pipes and externally chamfering the end of said anticorrosion ring, such that said chamfered end of said anticorrosion ring fits into said chamfered end faces of said pipes.

2. A method of producing a multiple-wall pipe structure as claimed in claim 1, comprising forming said chamfered end of each said ring to make a radially outwardly diverging slight angle relative to said chamfered end faces of said pipes, whereby when said ring is fitted to said end faces of said pipes before said friction-welding, a clearance opening radially outwardly is formed therebetween.

3. A method of producing a multiple-wall pipe structure as claimed in claim 1, comprising forming each said anticorrosion ring to have an inside diameter less than that of said inner pipe and an outside diameter greater than that of said outer pipe.

* * * * *